United States Patent [19]

Lehle

[11] Patent Number: 4,759,263

[45] Date of Patent: Jul. 26, 1988

[54] FLUID OPERATED CYLINDER DEVICE

[75] Inventor: Robert Lehle, Herrenberg, Fed. Rep. of Germany

[73] Assignee: Leibfried Maschinenbau GmbH, Herrenberg, Fed. Rep. of Germany

[21] Appl. No.: 67,605

[22] Filed: Jun. 26, 1987

[30] Foreign Application Priority Data

Jul. 9, 1986 [DE] Fed. Rep. of Germany ....... 3623143

[51] Int. Cl.$^4$ .................... F01B 31/14; F01B 29/04
[52] U.S. Cl. .................... 92/13.41; 92/60.5; 92/59; 92/128; 92/13.6; 403/307; 403/343
[58] Field of Search ............... 92/60.5, 13.6, 59, 128, 92/13.41; 403/307, 343

[56] References Cited

U.S. PATENT DOCUMENTS 1,059,560  4/1913  Parker ...................... 403/307
3,174,677  3/1965  Ramstad ................... 92/60.5
4,602,807  7/1986  Bowers ..................... 403/307

FOREIGN PATENT DOCUMENTS 2231873  1/1975  France ..................... 92/13.6
4515585  1/1964  Japan ...................... 92/13.6

Primary Examiner—Edward K. Look
Assistant Examiner—Thomas E. Denion
Attorney, Agent, or Firm—Henry M. Feiereisen

[57] ABSTRACT

A fluid operated device includes a cylindrical housing whose opposing ends are closed by suitable end covers and which accommodates a piston rod supporting a piston and made of at least two parts connectable to each other. One of the parts of the piston rod and the cylindrical housing are each provided in sufficient length to allow a subsequent shortening thereof to an axial length which corresponds to the requested stroke. The other components of the device are finished parts so that the fluid operated device can be provided in kit form which is not limited to carrying out one specific stroke but rather is adjustable for providing a stroke of any requested magnitude.

7 Claims, 2 Drawing Sheets

FLUID OPERATED CYLINDER DEVICE

BACKGROUND OF THE INVENTION

The present invention refers to a fluid operated cylinder device, in particular to a compressed air cylinder device of the type having a cylindrical housing which is closed at its opposing ends by a bottom and a lid and accommodates a piston rod with a piston supported thereon.

Such cylinder devices are widely used in numerous technical areas e.g. for controlling (shifting, tilting etc.) external units to which they are suitably coupled. Evidently, these various applications demand a wide variety of strokes. However, since the finally required stroke is only determined when installing the cylinder device and these conventional cylinder devices have only predetermined unalterable standard strokes, they are not suitable for such strokes which deviate from the standard strokes as no adjustment is possible.

SUMMARY OF THE INVENTION

It is thus a principal object of the present invention to provide an improved fluid operated cylinder device obviating the afore-stated drawbacks.

This object and others which will become apparent hereinafter are attained in accordance with the present invention by providing a piston rod which is made of at least two parts connectable to each other.

Through the provision of such a piston rod, the user is able to assemble a fluid operated cylinder device whose stroke is adjustable in an easy and fast manner to the needs of the user.

In a preferred embodiment, the piston rod is made of three parts, that is an inner rod section which supports the piston, an outer rod section adapted for connection with an external unit, and an intermediary rod section connecting the inner and outer rod sections to each other. Suitably, the inner rod section of the piston rod is represented by a socket-head screw while the intermediary rod section is preferably a simple cylindrical rod with a tapped bore at its opposing ends. Thus, by providing the inner and outer rod sections with suitable threaded connection pieces which are engageable in the tapped bores, the connection of the intermediary rod section with the inner rod section and the outer rod section is easily attainable.

The fluid operated cylinder device can thus be provided in a kit with essentially all components in a finished state except for the intermediary rod section and the cylindrical housing which are furnished at a sufficient length to allow shortening thereof to a length suitable for any given circumstances, i.e. adjustment to a length corresponding to the desired stroke of the cylinder device.

BRIEF DESCRIPTION OF THE DRAWING

The above and other objects, features and advantages of the present invention will now be described in more detail with reference to the accompanying drawing in which.

DESCRIPTION OF PREFERRED EMBODIMENTS

Figure 1:
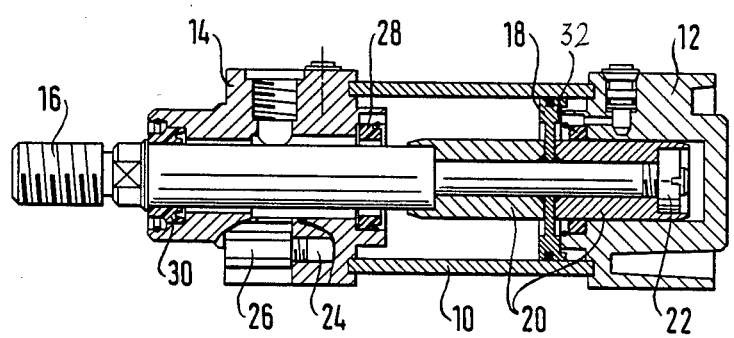
FIG. 1 is a schematic cross sectional view of a conventional cylinder device.

Referring firstly to FIG. 1, there is shown a schematic cross sectional view of a conventional cylinder device with elongated housing 10 whose opposing ends are respectively closed by a bottom 12 and a lid 14. Arranged within the housing 10 is a piston rod 16 which is sealed against the bottom 12 and the lid 14 by suitable seals 28, 30, 32. The piston rod 16 supports a piston 18 which is axially retained in its position by a pair of bushings 20 respectively extending at each side of the piston 18. A nut 22 is fastened on one end of the piston rod 16 to force the bushings 20 and the interposed piston 18 against a collar of the piston rod 16. Connection of the bottom 12 and lid 14 with the housing 10 is attained through tie rods 24 and pertaining nuts 26.

Although not shown in FIG. 1, the cylinder device is provided with suitable ports in the bottom 12 and the lid 14 to allow supply and discharge of a pressure fluid for actuation of the piston 18.

Such a conventional cylinder device has a predetermined stroke which is given by the dimensions of its individual parts, especially of the housing 10 and the piston rod 16 and thus is not variable to allow adjustment to other requested or required strokes.

Figure 2:
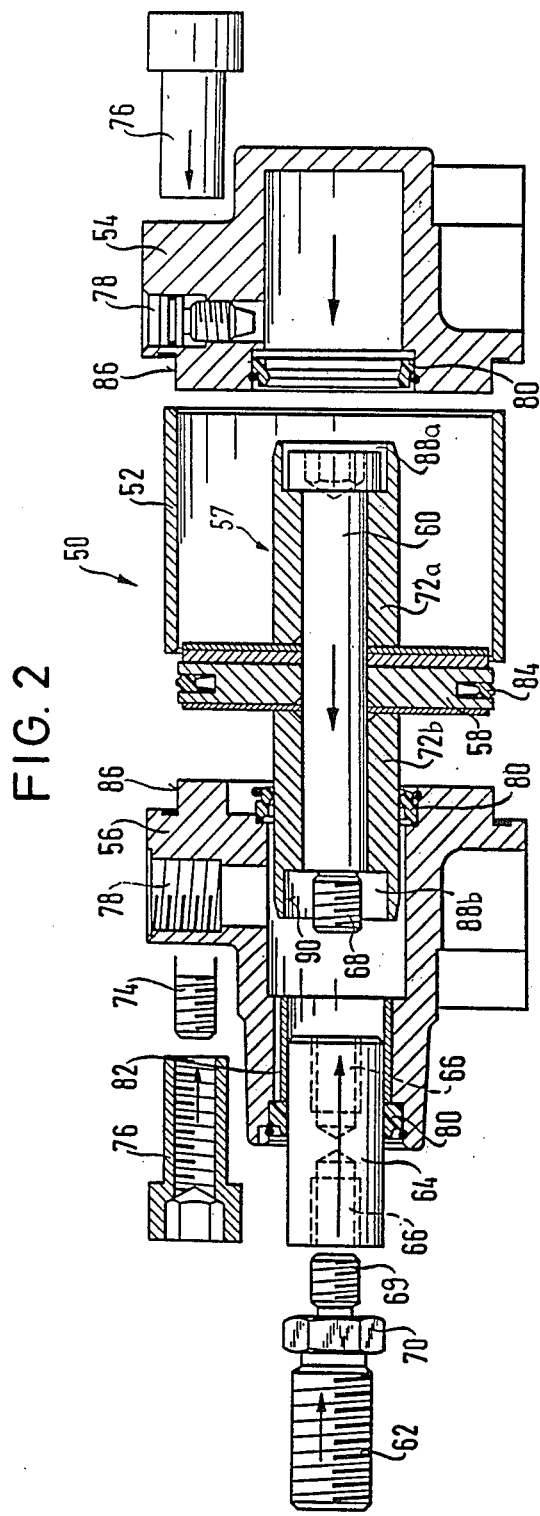
FIG. 2 is a schematic cross sectional view, in exploded illustration, of one embodiment of a cylinder device according to the invention.

Turning now to FIG. 2, there is shown a schematic cross sectional view in exploded illustration of one embodiment of a cylinder device in accordance with the invention which is generally designated by reference numeral 50 and includes a housing 52 in form of a cylindrical sleeve whose opposing ends are closed by respective end covers that is a bottom 54 at one end thereof and a lid 56 at its other end. Extending within the housing 52 is a piston rod generally designated by reference numeral 57 which is suitably guided for axial displacement. A piston 58 is supported by the piston rod 57 and is actuated by pressure fluid, in particular compressed air, which is supplied and discharged through ports 78 within the bottom 54 and the lid 56 so that the piston 58 and the piston rod 57 may reciprocate in an axial direction.

As shown in FIG. 2, the piston rod 57 is divided into three sections which are connectable to each other. Accordingly, the piston rod 57 comprises an inner rod section 60, an outer rod section 62 and an intermediary rod section or connector 64 which links the inner rod section 60 with the outer rod section 62. The inner rod section 60 is preferably in the shape of a socket-head screw adapted for cooperation with a suitable wrench and supports the piston 58 which is sandwiched between two bushings 72a, 72b extending along the inner rod section 60 at each side of the piston 58. The outer rod section 62 is suitably adapted for connection to an external unit (not shown) which is to be controlled or actuated by the cylinder device 50. The connector 64 is preferably a simple cylindrical rod and is guided during displacement in axial direction by a guide bush 82 which is disposed within the lid 56.

At its end facing the inner rod section 60, the connector 64 is provided with an axial tapped bore 66 which is engaged by a threaded connection piece 68 of the rod section 60. Likewise at its end facing the outer rod section 62, the connector 64 is provided with a further such tapped bore 66 which is engageable with a connection piece 69 of the outer rod section 62. Suitably, the outer rod section 62 is further provided with a screw head 70 for facilitating the engagement with the connector 64.

The piston rod 57 is thus simply assembled by screwing the inner and outer rod sections 60, 62 with their respective connection pieces 68, 69 into the matching tapped bore 66 at each side of the connector 64. During connection of the inner rod section 60 into the connector 64, the bushings 72a, 72b and thus the piston 58 are forced against the right end face of the connector 64 in FIG. 2 so that the piston 58 is axially retained on the inner rod section 60.

Each bushing 72a, 72b is preferably provided at their end remote to the piston 58 with a cylindrical recess 88a, 88b. Accommodated in the cylindrical recess 88a of the bushing 72a is the head of the socket-head screw defining the inner rod section 60 while the recess 88b of bushing 72b defines a cylindrical fitting surface 90 which during assembly of the piston rod 57 slides over the cylindrical outer surface of the connector 64 so that the bushing 72b and thus the inner rod section 60 of the piston rod 57 are centrally guided on the connector 64 e.g. with sliding fit or push fit.

To prevent any leakage, the piston rod 59 is sealed against the bottom 54 and the lid 56 by suitable seals 80 while piston 58 is provided with a piston packing 84.

In order to allow the cylinder device 50 to be used for a desired stroke, the components of the cylinder device 50 are all finished parts except for the cylindrical connector 64 and the hollow cylindrical housing 52. Those latter components are provided in a length which exceeds the expected or customer-desired or any given stroke, and thus are still to be cut to size during assembling of the cylinder device.

Thence, the cylinder device according to the invention can be offered in a kit in which basically all of the components are finished parts except for the connector 64 and the hollow cylindrical housing 52.

Before assembling, the user has only to prepare the connector 64 and the housing 52 in a length suitable for the desired or required stroke of the cylinder 50. Once the connector 64 and the housing 52 have been accordingly adjusted, the tapped bores 66 are cut into the connector 64 at each end thereof. The piston rod 57 is then assembled by screwing the connection pieces 68, 69 of the inner and outer rod sections 60, 62 in these tapped bores 66 which for providing a secure connection with the connection pieces 68, 69 are coated with an adhesive.

After arranging the piston 58 and the bushings 72a, 72b on the inner rod section 60, and inserting of the so-assembled piston rod 57 into the housing 52, the latter is closed at one end by the bottom 54 and at its other end by the lid 56. Advantageously, the bottom 54 and the lid 56 are each provided at their end facing the housing 52 with a shoulder 86 to attain an accurately and securely aligned assembly. Thereafter, the assembly is put together by suitable tie rods 74 which are tightened by nuts 76.

Of course, the length of the tie rods 74 is also dependent on the desired stroke; however, tie rods of this kind are merely cylindrical rods with threaded ends and are easily available in various lengths. It will readily be recognized, however, that these tie rods may also be part of a kit for a cylinder device according to the invention and furnished at a length which exceeds the assumed stroke so that the user can suitably shorten the tie rods to the required length and then cut the threaded section at each end thereof.

Evidently, it is also possible to furnish the connector 64 with only one tapped bore 66 at one end thereof so that the user of such a cylinder 50 has merely to trim the connector 64 to the requested length e.g. by breaking off or twisting off the other end which does not include the tapped bore 66 and then by cutting the thread in suitable manner. Preparation of the tie rods 74 can be done in the same manner.

Although the embodiment as shown in FIG. 2 is preferred, it will be appreciated that the piston rod 57 may be made of only two rod sections without departing from the spirit of the present invention. Accordingly, the outer rod section 62 is provided in one piece with the connector 64 and trimmed to the desired length in dependence on the desired stroke. At its end facing the inner rod section, this composite part is provided with a suitable tapped bore.

The adjustment of a cylinder device according to the invention to arbitrary strokes can be carried out by any mechanic in a fast and accurate manner as it is only required to trim the connector 64 and the housing 52 to the required length and to provide the tapped bores 66 in the connector 64.

While the invention has been illustrated and described as embodied in a Fluid Operated Cylinder Device, it is not intended to be limited to the details shown since various modifications and structural changes may be made without departing in any way from the spirit of my present invention.

What is claimed as new and desired to be protected by Letters Patent is set forth in the appended claims.

I claim:

1. A fluid operated device; comprising:
   a housing;
   piston means reciprocating in said housing and including a piston, a piston rod having an inner rod section supporting said piston, an outer rod section adapted for connection with an external unit, and an intermediary rod section connecting said inner and outer rod sections to each other; and
   support means for axially retaining said piston on said inner rod section, said support means including two bushings extending along said inner rod section and sandwiching said piston therebetween, at least one of said bushings facing said intermediary rod section having an end face provided with a cylindrical recess which defines a fitting surface sliding over the cylindrical outer surface of said intermediary rod section during assembly of said piston rod.

2. A fluid operated device as defined in claim 1 wherein said inner rod section of said piston rod is represented by a socket-head screw.

3. A fluid operated device as defined in claim 1 wherein said intermediary rod section of said piston rod is a cylindrical rod.

4. A fluid operated device as defined in claim 1 wherein said inner and outer rod sections are each provided with a threaded connection piece, said intermediary rod section defining two opposing ends each of which being provided with a tapped bore for engagement with said connection pieces of said inner and said outer rod sections.

5. A fluid operated device as defined in claim 1 wherein said outer rod section is provided in one piece with said intermediary rod section.

6. A fluid operated device as defined in claim 1 wherein said intermediary rod section and said housing are each of sufficient axial length to allow shortening thereof to a suitable length for adjustment of the stroke.

7. A kit for a fluid operated cylinder device; comprising:
   a cylindrical housing;
   end covers for closing opposing ends of said housing;
   piston means disposable in said housing and including a piston, a piston rod with an inner rod section for supporting said piston, an outer rod section adapted for connection with an external unit, and an intermediary rod section for connecting said inner and outer rod sections to each other; and
   support means including two bushings disposable along said inner rod section for axially retaining said piston on said inner rod section, at least one of said bushings facing said intermediary rod section having an end face provided with a cylindrical recess which defines a fitting surface slidable over the cylindrical outer surface of said intermediary rod section during assembly of said piston rod, said intermediary rod section and said housing each being of sufficient axial length to allow shortening thereof to a suitable length for adjustment of the stroke.

* * * * *